(12) United States Patent
Taira et al.

(10) Patent No.: US 7,808,704 B2
(45) Date of Patent: *Oct. 5, 2010

(54) DISPERSIVE ELEMENT, DIFFRACTION GRATING, COLOR DISPLAY DEVICE, DEMULTIPLEXER, AND DIFFRACTION GRATING MANUFACTURE

(75) Inventors: Yoichi Taira, Tokyo (JP); Daiju Nakano, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/964,584

(22) Filed: Dec. 26, 2007

(65) Prior Publication Data

US 2008/0112052 A1 May 15, 2008

(51) Int. Cl.
*G02B 5/18* (2006.01)
(52) U.S. Cl. .................... 359/569; 359/576; 359/567
(58) Field of Classification Search .................. 359/569, 359/567, 576
See application file for complete search history.

(56) References Cited

U.S. PATENT DOCUMENTS

| 4,129,382 A | 12/1978 | Greenaway |
| 4,448,485 A | 5/1984 | Bergman et al. |
| 5,007,709 A | 4/1991 | Iida et al. |
| 5,080,465 A | 1/1992 | Laude |
| 5,138,495 A * | 8/1992 | Shiono et al. ............... 359/742 |
| 6,671,100 B1 * | 12/2003 | McRuer ..................... 359/630 |
| 7,315,419 B2 * | 1/2008 | Taira et al. .................. 359/569 |
| 2005/0219701 A1 | 10/2005 | Balakrishnan et al. |

FOREIGN PATENT DOCUMENTS

| JP | 63-293546 | 11/1988 |
| JP | 5-341132 | 12/1993 |
| JP | 6-222362 | 8/1994 |
| JP | 2000-249819 | 9/2000 |
| JP | 2002-040221 | 2/2002 |
| JP | 2002-189112 | 7/2002 |

* cited by examiner

*Primary Examiner*—Joshua L Pritchett
(74) *Attorney, Agent, or Firm*—Cantor Colburn LLP; Vazken Alexanian

(57) ABSTRACT

In a transmission grating as a dispersive element, diffraction efficiency is enhanced and manufacturing costs are considerably reduced. A dispersive element includes resin members for forming a diffraction grating, being composed of a plurality of diffraction grating members having a cross-sectional shape respectively surrounded by two straight lines such as a triangular shape, and metal members as light-shielding members each being formed on corresponding one of the diffraction grating members at one side of the diffraction grating member along any of the straight line and the curved line of the cross-sectional shape of the diffraction grating member formed by the resin member. The metal members are configured to reduce zero-order transmitted light with respect to incident light, and to enhance diffraction efficiency of first-order transmitted light.

14 Claims, 12 Drawing Sheets

FIG.2

|  | WITH METAL | WITHOUT METAL |
|---|---|---|
| LUMINANCE | 1400 | 2305 |
| S-POLARIZED LIGHT | | |
| FIRST-ORDER TRANSMISSION | 24.1% | 22.2% |
| ZERO-ORDER TRANSMISSION | 19.8% | 3.0% |
| ZERO-ORDER REFLECTION | 41.9% | 57.1% |
| FIRST-ORDER REFLECTION | 10.4% | 3.7% |
| P-POLARIZED LIGHT | | |
| FIRST-ORDER TRANSMISSION | 6.6% | 25.1% |
| ZERO-ORDER TRANSMISSION | 48.4% | 10.7% |
| ZERO-ORDER REFLECTION | 36.7% | 26.7% |
| FIRST-ORDER REFLECTION | 3.3% | 1.8% |
| EFFECTIVENESS | 24.2% | 39.5% |

FIG.3
(a)
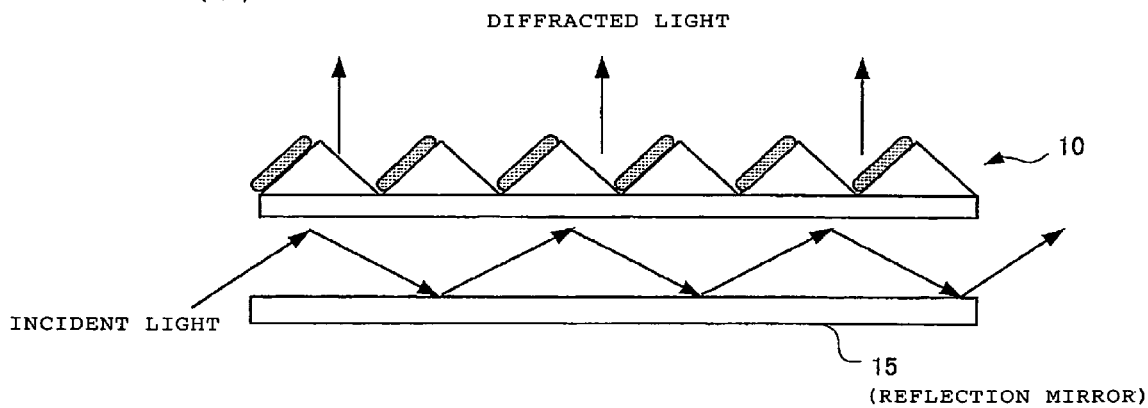
(b)
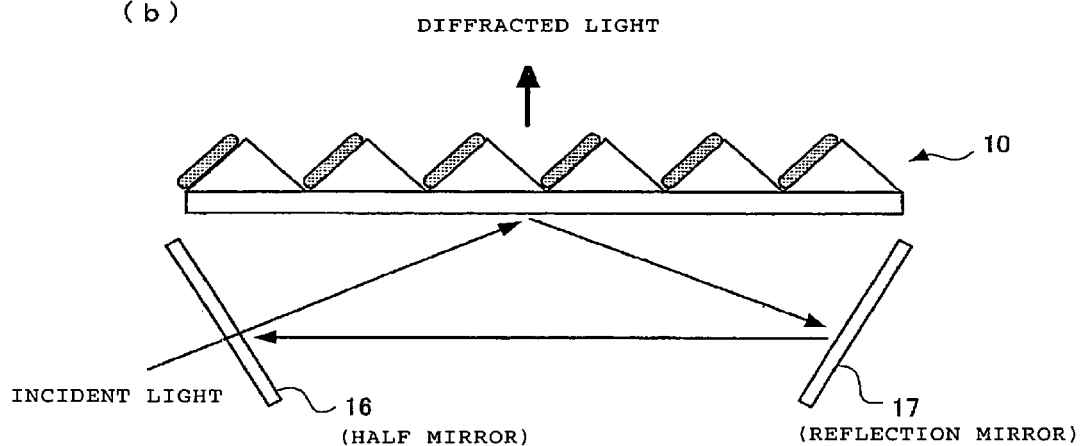

FIG.5
(a)
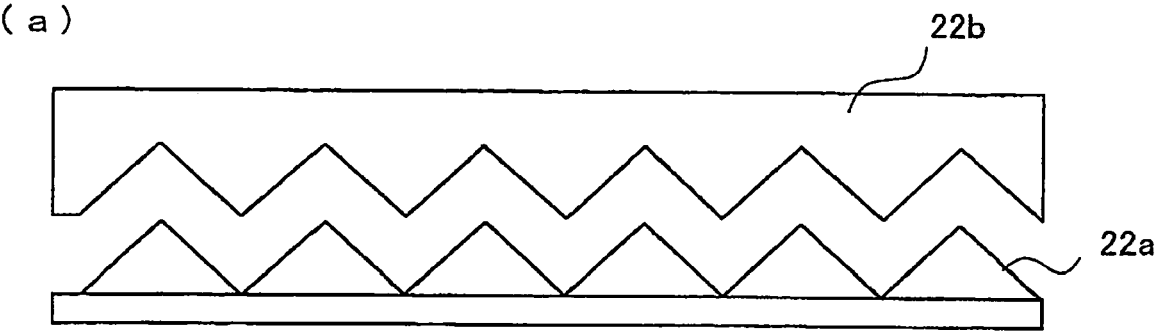
(b)
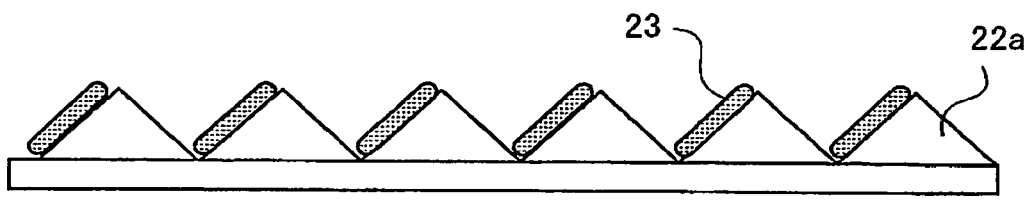
(c)
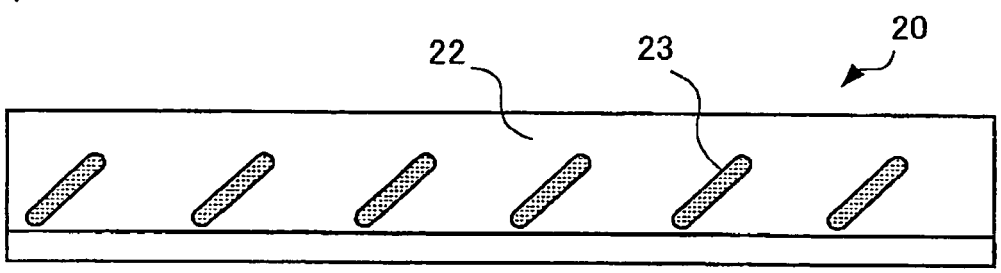

FIG. 6
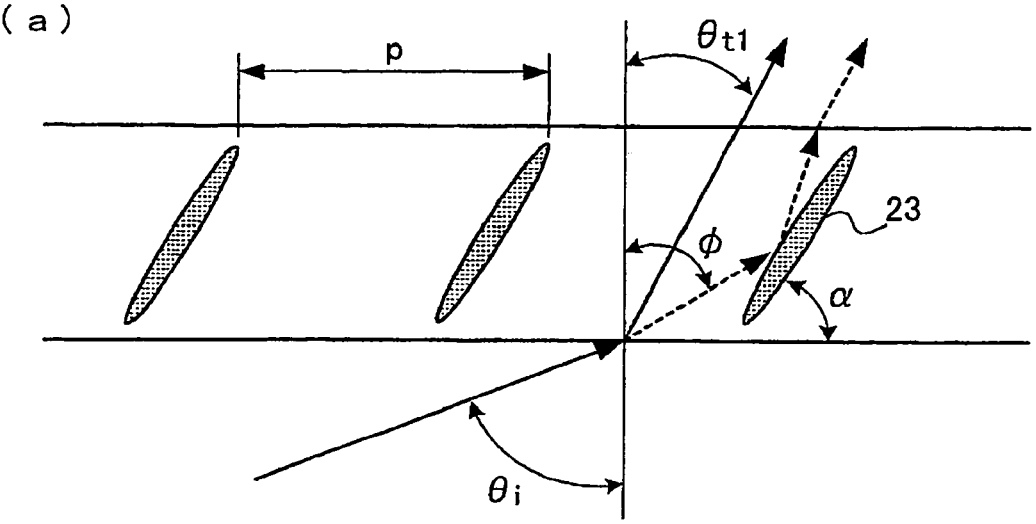
(a)
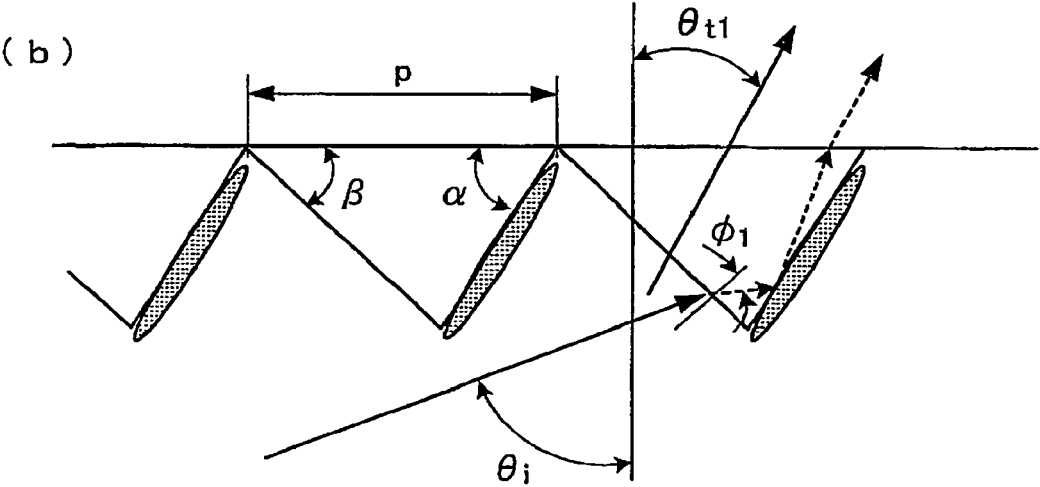
(b)
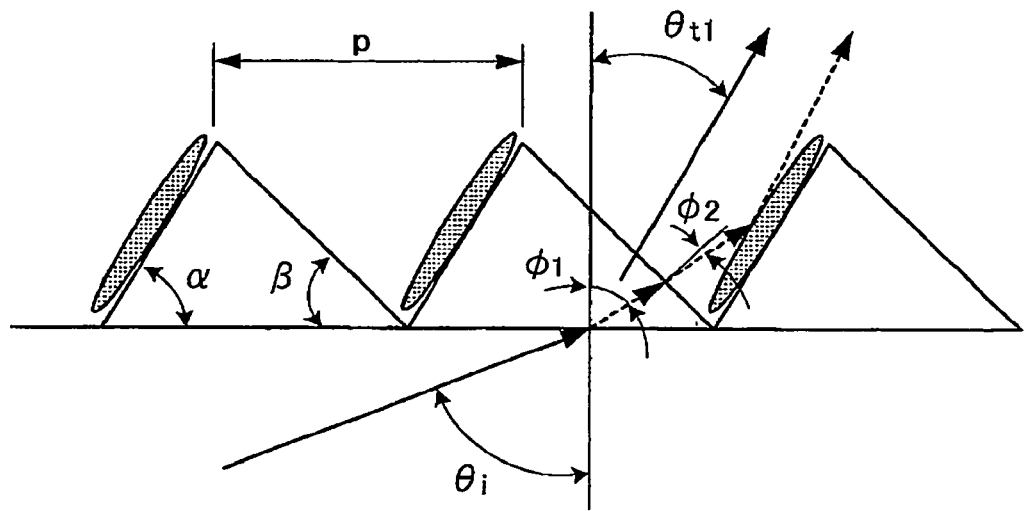
(c)

FIG.10
(a)
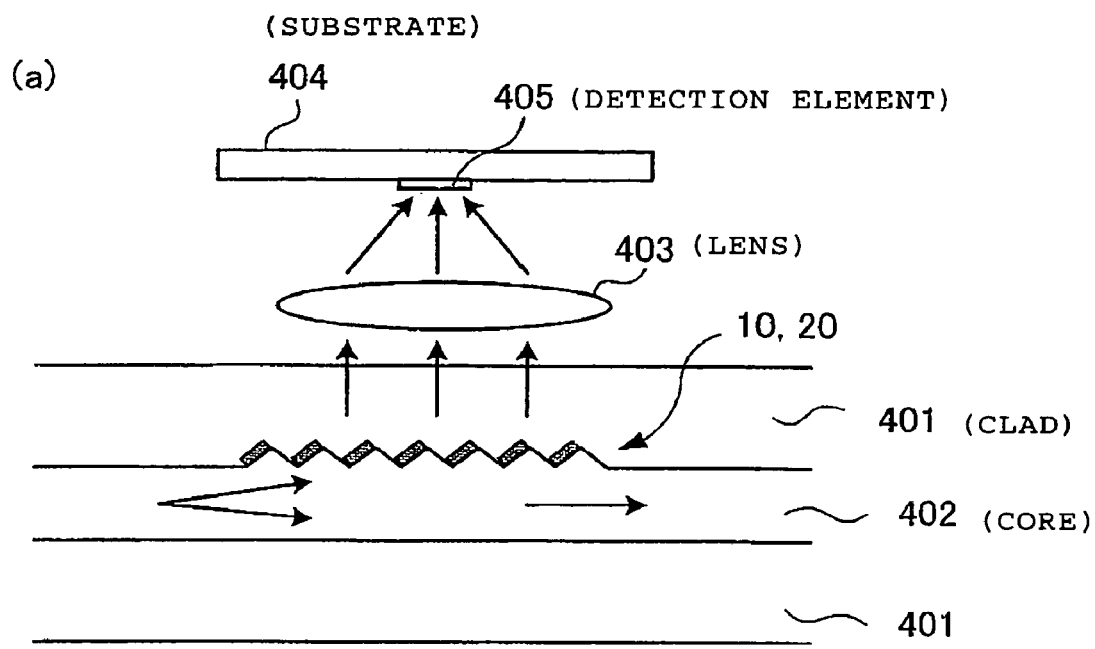
(b)
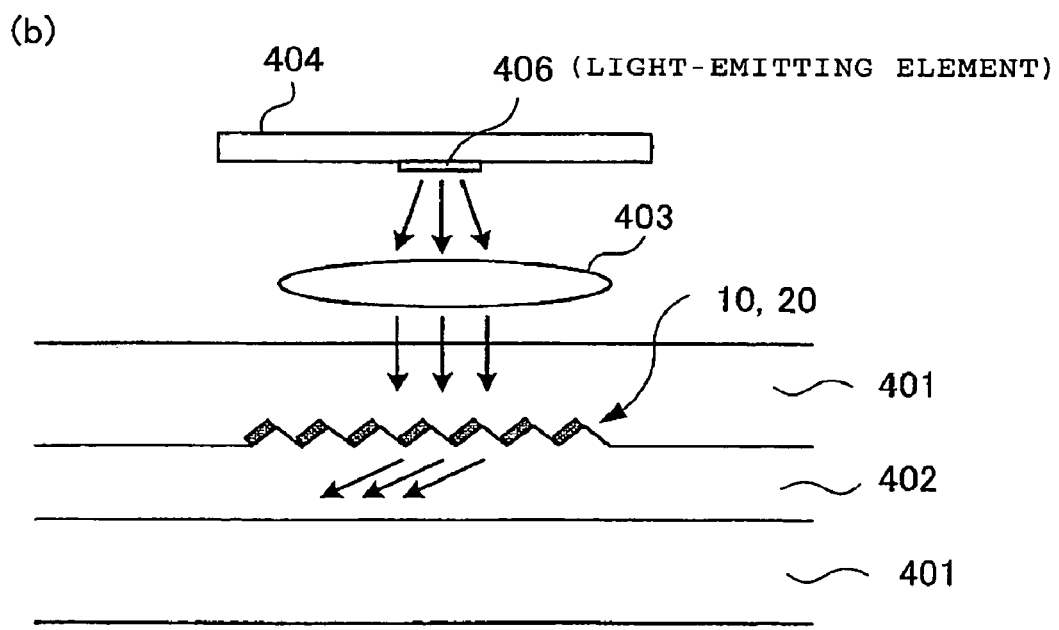

DISPERSIVE ELEMENT, DIFFRACTION GRATING, COLOR DISPLAY DEVICE, DEMULTIPLEXER, AND DIFFRACTION GRATING MANUFACTURE

BACKGROUND OF THE INVENTION

The present invention generally relates to dispersive elements and the like, and more specifically to dispersive elements and the like such as transmission gratings used in optical instruments.

Diffraction gratings are used in various optical instruments. Specifically, many diffraction gratings are used in spectrometers, wave filters and the like to utilize sharp dispersion characteristics thereof. Moreover, it is possible to manufacture the diffraction gratings while arbitrarily determining pitches thereof. Accordingly, a diffraction grating is sometimes used as an angle changing element, a light separating and mixing element or the like in an instrument using a light source such as a laser. The application of the diffraction grating also spreads to the field of displays where light is used as a means of expression instead of a means of communication.

There are already numerous basic researches and implementation examples involving the diffraction gratings, which are compiled in "Introduction to diffractive optical elements" (edited by optical design research group, Optical Society of Japan affiliated to The Japan Society of Applied Physics, published by The Optronics, Co., Ltd.) or the like, for example. To enhance diffraction efficiency, transmission gratings include a blazed type, a binary type, and the like.

FIG. 11 is a view for explaining a configuration of a conventionally used blazed-type diffraction grating. The blazed-type diffraction grating is designed to have a triangular cross-sectional shape with two straight lines so as to enhance the diffraction efficiency for a specific wavelength. That is, as shown in FIG. 11, the surface shape of the blazed-type diffraction grating is formed into grooves with triangular cross-sectional shapes (saw-tooth shapes), and a base angle of this triangle is equivalent to a blaze angle.

Meanwhile, an unillustrated binary-type diffraction grating includes finely arranged rectangles with different levels in terms of cross-sectional shapes. Such a shape is formed by lithography or electron beam drawing.

In the meantime, instead of the diffraction grating, there is also an element formed by arranging metal thin lines as polarizers ("Basic optics", co-authored by Keiei Kudo and Fumiya Uehara, Gendai Kogaku Sha). This element is formed by arranging metal thin lines such as wires evenly in a lattice and is configured to utilize functions of absorbing or reflecting parallel polarized components with respect to the thin lines and to transmit only perpendicular polarized light with respect to the thin lines. This element is normally referred to as a wire grid polarizer. In general, the thin lines can be formed at intervals of 1 μm at the smallest. Accordingly, the use of the wire grid polarizer is limited to a linear polarizer for infrared rays, for example. Based on the same principle, there is also provided a type of a reflection grating called an echelette grating with shallow blaze angles, in which grating constant is reduced by forming metal thin lines thereon by means of oblique evaporation of metal.

FIG. 12 is a view showing an example of the wire grid polarizer. Here, the shape of the echelette grating as the reflection grating is utilized to form the metal thin lines on ridge portions by oblique evaporation of the metal. By narrowing the grating constant, the wire-grid polarizer is used as a linear polarizer in the range from near infrared rays to visible light. In such a polarization element, the widths of the metal thin lines are made as small as possible by means of evaporating the metal only on the ridge portions of the diffraction grating having triangular cross sections. This is because an increase in the width of the metal thin line causes a decline in efficiency as the polarizer due to an increase in intensity of first-order diffracted light. In general, the polarizer does not function properly unless the intervals of the thin lines are set to one-tenth or below of a wavelength and the widths thereof are set to one-hundredth of the wavelength. Since an element of this kind is used in the form of vertical incidence and transmission with respect to the surface thereof, the original function as the echelette grating is also restrained.

In the meantime, among the related art disclosed in patent publications, there is a technique adopted as a method of manufacturing a diffraction grating for use in photoresist, in which a metal-deposited pattern is formed only on one oblique surface of a diffraction grating, for example (see Patent Document 1, for example). Moreover, there is also disclosed a technique including the steps of forming a resist film only on one oblique surface by oblique evaporation, etching, and then removing the obliquely evaporated resist film (see Patent Document 2, for example).

[Patent Document 1]
Japanese Unexamined Patent Publication No. 63 (1988)-71851 (Page 3, FIG. 1)
[Patent Document 2]
Japanese Unexamined Patent Publication No. 59 (1984)-210403 (Pages 2 to 3, FIG. 1)

Now, in the above-described diffraction grating of the binary type, it is necessary to finely arrange rectangles with different levels in terms of cross-sectional shapes. Accordingly, there are numerous manufacturing processes, and an obtained diffraction grating is very expensive. On the other hand, the blazed type can be manufactured by molding or resin molding through press work as long as a mould is prepared. Accordingly, the blazed type is less expensive and excellent in mass production capability. However, first-order diffraction efficiency of a transmission grating of the blazed type is limited to about 20% at the maximum. Accordingly, when the efficiency is raised for a specific wavelength, a trouble arises in a device dealing with a multi-color light source such as a display because the efficiency of other wavelengths is reduced. Therefore, when the transmission grating of the blazed type is used as a diffraction element, it is necessary to raise the diffraction efficiency and particularly to reduce zero-order transmitted light.

That is, when the transmission grating is used, the zero-order diffracted light, i.e. the directly transmitted incident light inevitably occurs. However, the zero-order diffracted light not only deteriorates utilization efficiency of the light but also incurs stray light for other optical devices located in the vicinity, and thereby causing a problem in terms of a device layout and accuracy. Accordingly, to enhance the diffraction efficiency, it is effective to reduce the zero-order transmitted light.

In the meantime, to enhance the diffraction efficiency, it is necessary to form a diffraction grating member of the diffraction grating into an optimal shape. However, such an optimal shape is complicated and delicate. Accordingly, it is necessary to use electron beam drawing, lithographic technology, and the like upon formation. Since a small size is sufficient for use in the field of optical communication or the like, such a process is relatively easy. However, for use in a display or a projector, the size of the diffraction grating member needs to be as large as several centimeters to 30 centimeters each. Such a diffraction grating member is difficult to process, or even if processed, applicable process costs will be enormous. For this reason, there is an increasing demand for a diffraction grating in the field of a display system, for example, which has a large size, capability of formation at low costs, high diffraction efficiency, and a performance to reduce the zero-order transmitted light in particular. Such a demand is high especially in the field of a liquid crystal display which does not apply a color filter, and the like.

The wire grid polarizer using the echelette grating shown in FIG. 12 is not an application as the diffraction grating in a dispersive element for selecting a specific wavelength or the like, but is merely an application as the polarizer for absorbing/reflecting the polarized components parallel to the thin lines. Accordingly, the metal is evaporated only on the ridge portions of the asperities. It is not possible to reduce the zero-order diffracted light and to enhance the diffraction efficiency when this element is used as the diffraction grating.

Meanwhile, although the oblique evaporation is performed in the technique according to Patent Document 2, the film formed by the oblique evaporation is a resist film and the evaporated film is removed in a finished product. For this reason, no metal film is formed on the produced diffraction grating. Therefore, it is not possible to achieve enhancement of the diffraction efficiency by reducing the zero-order transmitted light in the diffraction grating as the dispersive element.

Moreover, although the metal is obliquely evaporated according to Patent Document 1, the technique of Patent Document 1 is intended to be used as photoresist but is not designed for use in the diffraction grating as the dispersive element. For this reason, the technique according to Patent Document 1 considers a case where a contrast ratio of a projection pattern of the diffraction grating becomes largest, and therefore a semitransparent film is selected as the metal film to be obliquely evaporated so that an intensity ratio between zero-order diffracted light and first-order diffracted light becomes 1 to 1 ratio. To be more precise, metal such as chromium oxide is thinly evaporated in a thickness from 10 to 100 nm. Therefore, even if the technique according to Patent Document 1 is adopted, it is not possible to achieve enhancement of the diffraction efficiency by reducing the zero-order diffracted light. Accordingly, this technique has a difficulty in achieving a performance required in recent years as the diffraction grating to be used in the dispersive element.

SUMMARY OF THE INVENTION

Therefore, an aspect of the present invention is to provide a transmission grating as a dispersive element which can enhance diffraction efficiency and considerably reduce manufacturing costs.

Another aspect of the present invention is to considerably enhance the diffraction efficiency by suppressing zero-order transmitted diffracted light as much as possible and actively utilizing first-order diffracted light.

In an example embodiment to attain the aspects, a dispersive element adopting the present invention includes a diffraction grating, being composed of a plurality of diffraction grating members having a cross-sectional shape respectively surrounded by any of two straight lines and a curved line; and a plurality of light-shielding members, each being formed on corresponding one of the diffraction grating members at one side of the diffraction grating member along any of the straight line and the curved line of the cross-sectional shape.

A diffraction grating adopting the present invention includes a resin layer; and a plurality of metal surfaces provided inside the resin layer, the metal surfaces being arranged periodically each of which has an inclination of a given blaze angle from a film surface. Here, it is preferable in light of capability of considerably enhancing the diffraction efficiency when the given blaze angle of the metal surface is determined so as to suppress zero-order transmitted light and to enhance diffraction efficiency of first-order transmitted light with respect to incident light.

Moreover, a combined diffraction element adopting the present invention includes a transmission grating having a plurality of metal surfaces being arranged to be inclined in a direction to shield zero-order transmitted light with respect to incident light; and a reflecting member for returning zero-order reflected light with respect to the incident light from the transmission grating back to the transmission grating.

BRIEF DESCRIPTION OF THE DRAWINGS

For a more complete understanding of the present invention and the advantages thereof, reference is now made to the following description taken in conjunction with the accompanying drawings.

FIG. 2 is a chart showing measurement results of respective efficiencies before and after evaporation of metal on the transmission grating.

FIGS. 3A and 3B are views showing an embodiment of a combined diffraction grating.

FIGS. 5A to 5C are views for explaining a method of manufacturing the transmission grating.

FIGS. 6A to 6C are views for explaining relations among an incident angle, a blaze angle, and a pitch.

FIGS. 10A and 10B are views showing configuration examples of using the diffraction grating adopting the embodiment as a demutiplexer by attaching it to a waveguide.

DETAILED DESCRIPTION OF THE INVENTION

Figure 1:
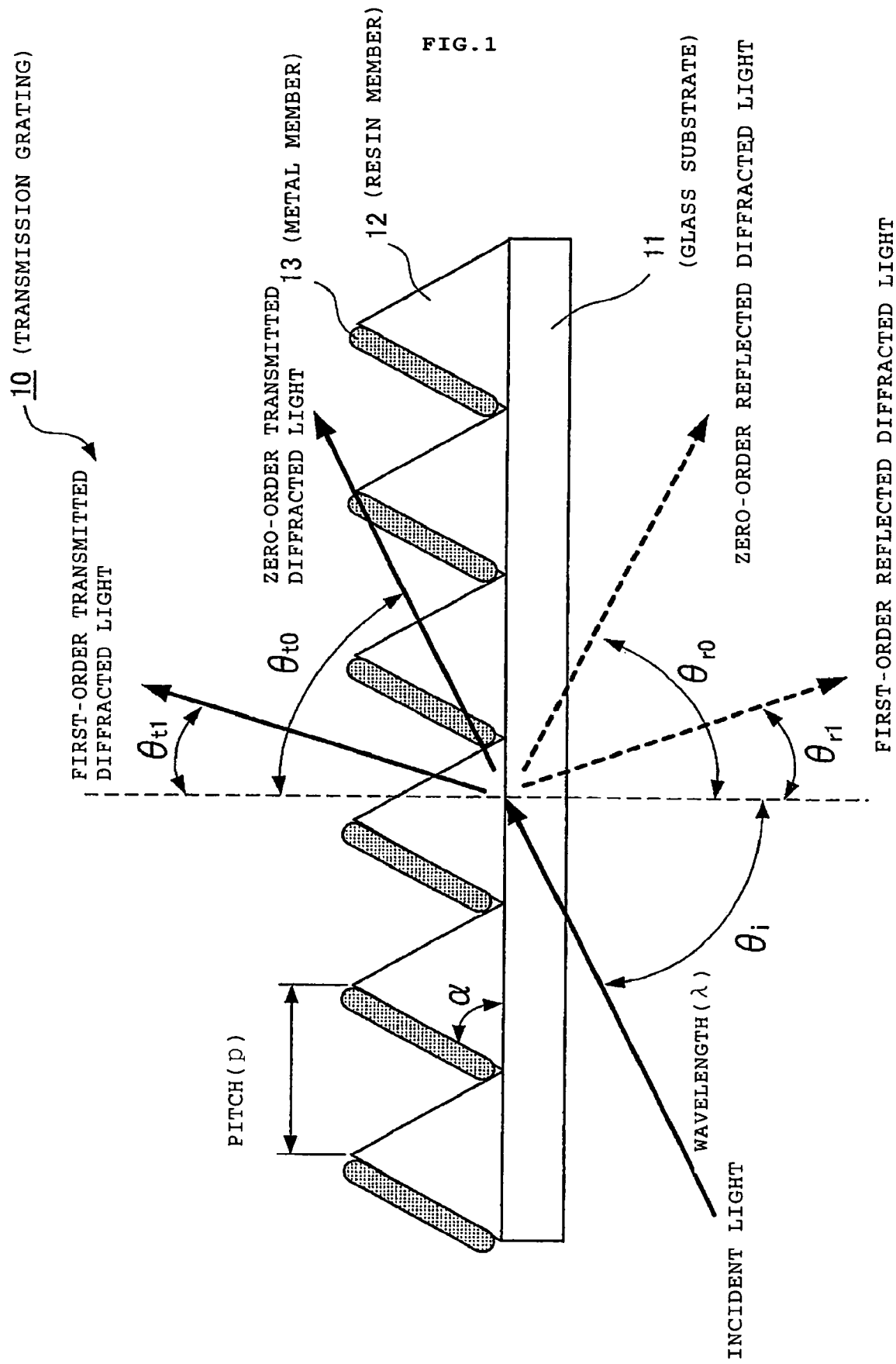
FIG. 1 is a view for explaining a first transmission grating adopting an embodiment of the present invention.

The present invention provides a transmission grating as a dispersive element which can enhance diffraction efficiency and considerably reduce manufacturing costs. It also considerably enhances the diffraction efficiency by suppressing zero-order transmitted diffracted light as much as possible and actively utilizing first-order diffracted light.

An example embodiment having a dispersive element adopting the present invention includes: a diffraction grating, being composed of a plurality of diffraction grating members having a cross-sectional shape respectively surrounded by any of two straight lines and a curved line; and a plurality of light-shielding members, each being formed on corresponding one of the diffraction grating members at one side of the diffraction grating member along any of the straight line and the curved line of the cross-sectional shape. Here, this light-shielding member is preferably configured to reduce zero-order transmitted light and to enhance diffraction efficiency of first-order transmitted light with respect to incident light, from the viewpoint of capability of establishing a system which has high utilization efficiency of light. Moreover, this light-shielding member can be characterized in that metal is evaporated on the diffraction grating member at one side of the diffraction grating member along any of the straight line and the curved line of the cross-sectional shape from an oblique direction. Furthermore, when this light-shielding member is characterized in that the metal is evaporated on the diffraction grating member at one side of the diffraction grating member along any of the straight line and the curved line of the cross-sectional shape in a thickness of 200 nm or above, the dispersive element is excellent in suppressing zero-order transmitted light more and in enhancing a function as a reflecting film. In addition, this diffraction grating member of the diffraction grating can be characterized by having a triangular cross-sectional shape surrounded by two straight lines, and the light-shielding member is formed by evaporating metal on one of oblique surfaces of the diffraction grating member.

Here, the "light-shielding member" can be also referred to as a "reflecting member". Silver or aluminum metal is used as this "reflecting member", and reflectance thereof is set to 90% or greater at a used wavelength.

Meanwhile, a diffraction grating adopting the present invention includes a resin layer; and a plurality of metal surfaces provided inside the resin layer, the metal surfaces being arranged periodically each of which has an inclination of a given blaze angle from a film surface. Here, it is preferable in light of capability of considerably enhancing the diffraction efficiency when the given blaze angle of the metal surface is determined so as to suppress zero-order transmitted light and to enhance diffraction efficiency of first-order transmitted light with respect to incident light.

Moreover, a combined diffraction element adopting the present invention includes a transmission grating having a plurality of metal surfaces being arranged to be inclined in a direction to shield zero-order transmitted light with respect to incident light; and a reflecting member for returning zero-order reflected light with respect to the incident light from the transmission grating back to the transmission grating. Here, this transmission grating can be characterized by being formed by obliquely evaporating metal from one side of the diffraction grating. Moreover, it is preferable in light of capability of allowing the zero-order reflected light to be incident again on the transmission grating at a similar angle to the incident light when the reflecting member is disposed approximately in parallel to a substrate of the transmission grating. Furthermore, when a plurality of reflecting mirrors are disposed, the combined diffraction element is excellent in circulating the reflected light.

From another point of view, a combined diffraction element adopting the present invention includes a light source; a light guide for guiding light emitted from the light source; and a diffraction grating provided integrally with the light guide, the diffraction grating having metal surfaces having high reflectance arranged periodically with an inclination of a blaze angle. Here, this diffraction grating can be characterized by being adhered with an adhesive having a lower refractive index than the light guide. Moreover, this diffraction grating can be characterized by being formed by use resin having a lower refractive index than the light guide.

In the meantime, a color display device adopting the present invention includes a light source, a diffraction grating for separating light emitted from the light source into light components at a plurality of wavelength ranges, and a lens for accepting the light component separated by the diffraction grating and condensing the light component of a given wavelength range so as to correspond to a given sub-pixel, in which the diffraction grating can be characterized in that metal surfaces having high reflectance are arranged periodically with an inclination of a given angle. Here, the color display device may further include a waveguide for guiding the light from the light source; and a reflecting plate for reflecting the light toward the diffraction grating which has been guided by the waveguide; moreover, may include a liquid crystal cell for performing transmission and shielding of the light component separated by the diffraction grating and condensed by the lens.

On the other hand, the present invention can be regarded as a demutiplexer. An aspect of the demutiplexer includes a waveguide for guiding light; a transmission grating element for splitting light traveling in the waveguide while suppressing zero-order transmitted light, provided adjacently to the waveguide; and a detecting element for detecting the light split by the transmission grating element. Here, this transmission element can be characterized by having a plurality of metal surfaces arranged periodically each of which has an inclination of a given blaze angle from a film surface. Moreover, this waveguide can be characterized by including a core layer and a clad layer having a lower refractive index than the core layer, and the transmission grating element is formed between the core layer and the clad layer.

Alternatively, another demutiplexer adopting the present invention includes a waveguide for guiding light within a critical angle to be determined by a difference in refractive index between a core and a clad; and a transmission grating element provided between the core and the clad in the waveguide in which metal surfaces are obliquely and periodically arranged.

Furthermore, a method of manufacturing a diffraction grating adopting the present invention includes the steps of forming a diffraction grating by use of a mould and resin, evaporating metal on the formed diffraction grating from an oblique direction, and planarizing a surface of the diffraction grating with the evaporated metal by burying with resin.

Thus, according to the present invention, it is possible to achieve high diffraction efficiency in an application to a dispersive element, for example.

Hereinafter, embodiments of the present invention will be described with reference to accompanying drawings. FIG. 1 is a view for explaining a first transmission grating adopting an embodiment of the present invention. In a transmission grating 10 shown in FIG. 1, a blazed-type diffraction grating is formed on a glass substrate 11 which is a substrate by use of transparent resin members 12 in a saw-tooth shape. In the transmission grating 10 shown in FIG. 1, a portion of the transparent resin members 12 is placed upward. Metal members 13 are evaporated on oblique surface on one side of the saw-tooth shape in this blazed-type diffraction grating (each oblique surface of one of two straight lines constituting a triangular cross-sectional shape). The metal member 13 is preferred to be low in absorption at a used wavelength and to be evaporated easily. Therefore, aluminum, silver or the like is used, for example. In view of the nature of this embodiment for use in a dispersive element, the metal member 13 is evaporated in a thickness of 200 nm or above. This is a large difference from the conventional technique of evaporating a metal film in a thickness from 10 to 100 nm to effectuate semi-transmission for use in a photomask, for example. Moreover, in this embodiment, an angle formed between each piece of the metal member 13 and a surface of the glass substrate 11 is defined as [alpha], which corresponds to a blaze angle. In general, the blaze angle means an angle formed by a groove carved in the diffraction grating. When the metal member 13 such as aluminum is evaporated on one surface of the blazed-type diffraction grating, it is possible to reduce zero-order transmitted diffracted light (directly penetrating light) and to enhance first-order diffraction efficiency.

Basic formulae of transmission and diffraction are as follows:

sin[theta]$t1$−sin[theta]$i$=sin[theta]$r1$−sin[theta]$i$=$m$ [lambda]/$p$

[theta]$t0$=[theta]$r0$=[theta]$i$

Here, [theta]$i$ is an incident angle of incident light, [theta]$t1$ is an outgoing angle of first-order transmitted diffracted light, [theta]$r1$ is an outgoing angle of first-order reflected diffracted light, [lambda] is a wavelength of the incident light, and p is the grating pitch. Moreover, m is the diffraction order. In a formula for the first-order transmitted diffracted light, m is equal to 1.

As it is apparent from the foregoing formulae, diffraction angles (the outgoing angle of the transmitted diffracted light and the outgoing angle of the reflected a diffracted light) are determined by the pitch p of the diffraction grating, the wavelength [lambda] of the incident light, and the incident angle [theta]$i$. In the case of the transmission grating 10, a complicated calculation is required for diffraction efficiency; however, the diffraction is determined by surface shape, material (an absorption characteristic and dispersion), refractive index, and the like.

In this embodiment, a path for the zero-order transmitted light is shielded by the evaporated metal member 13 on one side of the groove (not entirely shielded but approximated to 0), whereby a reflecting surface is adapted to be a new diffraction surface. Although a direction of diffraction is determined by the pitch p (the order determined by m in the formula), distribution of energy for zero-order transmission is reduced by an effect of metal surfaces of this metal member 13, and the amount of such reduction is distributed to first-order transmission and zero-order reflection. A proportion of such distribution is determined by the cross-sectional shape (especially by the blaze angle). Therefore, the incident light has a limitation; specifically, the incident angle is limited to a range from [alpha], which is the blaze angle, to 90 degrees. In the meantime, the direction of incidence can be selected from both a direction onto a side of a surface evaporated with the metal member 13 and a direction onto an opposite side thereto. However, it is preferable to allow the light to be incident onto the opposite side. Although the pitch of the diffraction grating is determined by the wavelength and the angle of the incident light used therein, preferably being in a range from 0.4 [micrometers] to 5 [micrometers] for mainly visual light or infrared rays.

Here, in the example shown in FIG. 1, the metal member 13 which is a light-shielding member (a reflecting member) is formed on one of the oblique surface of the saw-tooth shape of the resin member 12, that is, at one side of the two straight lines constituting the triangular cross-sectional shape. However, the cross-sectional shape of the resin member 12 may include a shape consisting of an entire arc or a shape including an arc on one side. That is, when one side of the cross-sectional shape is a straight line and the other side thereof is a curved line, it is possible to evaporate the metal member 13 on either the straight line side or the curved line side. It is also possible to form the metal member 13 on one side of the curved line of the entire arc. In the metal member 13 as the light-shielding member which is formed in this case, an angle formed between a tangent of the arc and a bottom surface can be regarded as the blaze angle [alpha].

Next, a general method of manufacturing the transmission grating 10 shown in FIG. 1 will be described.

Firstly, the blazed-type diffraction grating before metal evaporation is manufactured. As a method of manufacturing this blazed-type diffraction grating, grooves having triangular cross-sectional shapes are carved on metal such as copper or nickel with a cutting machine called a ruling engine, for example. The actual cutting portion is a diamond blade (bite). The shape of the bite is previously formed into the cross-sectional shape. A reflection grating is finished only by cutting with the ruling engine; however, anisotropic ion beam etching is performed to increase flatness of the groove surfaces. Accordingly, the blazed-type diffraction grating having one side formed of the flat surface is finished. A mould is formed by reversing this mother mould through electroforming, and then this mould is further subjected to molding by use of transparent resin. In this way, the blazed-type diffraction grating of the transmissive type can be formed.

In another method of manufacturing the blazed-type diffraction grating before metal evaporation, anisotropic ion etching with a mask by using edges of crystal of a silicon substrate, for example, is conducted to form a blazed-type diffraction grating having smooth surfaces on both groove surfaces. Then, a mould is formed by reversing this mother mould through electroforming, and the transmission grating 10 can be formed by molding with transparent resin. There is also a method of forming a larger mould for a large size, such as 30 cm by 30 cm or above, by copying the mother mould by electroforming and then by tiling. When the mould is formed as described above, it is possible to mass-produce the diffraction grating at low costs because the diffraction grating can be formed by molding or press working of the resin. The resin can be of a thermosetting type or a photocuring type. The resin can be of any type as long as the resin is transparent in the used wavelength range and is easily peeled off from the mould. The produced diffraction grating can be formed into a block shape or a sheet shape.

Thereafter, the diffraction grating is put into an evaporation apparatus and is subjected to oblique evaporation of the metal members 13. A general method can be used as a method of oblique evaporation, and it is possible to draw upon oblique evaporation applied to evaporation of a magnetic substance on a magnetic tape, and the like. As described above, the metal member 13 is preferred to be low in absorption at the used wavelength and to be evaporated easily. Therefore, aluminum, silver or the like is preferably used, for example. It is possible to manufacture the transmission grating 10 shown in FIG. 1 according to the above-described manufacturing process.

Next, description will be made on an example where an element is actually produced as a trial and measured. As for the element produced as a trial, a mould was produced by electroforming to reverse the shape based on a mother mould formed by subjecting silicon to anisotropic etching, and then a diffraction grating was formed by molding photocuring resin (photopolymer) with the mould. The photopolymer used therein was selected from a material which was excellent in transparency to visible light and was suitable for the transmission grating 10. Aluminum was obliquely evaporated as the metal members 13 on the saw-tooth-shaped diffraction grating thus formed. Trial conditions were as follows:

| | |
|---|---|
| Grating pitch: | 1800 lines/mm (556 nm) |
| Blaze angle: | 58 degrees |
| Refractive index (photocuring resin): | 1.49 |
| Aluminum deposition thickness: | 200 nm |
| Evaporation angle: | 60 degrees. |

Meanwhile, measurement conditions were as follows:

| | |
|---|---|
| Incident angle: | 80 degrees |
| Used wavelength: | 543 nm (laser) |

FIG. 2 is a chart showing measurement results of respective efficiencies before and after evaporation of the metal members 13 on the transmission grating 10 obtained by the above-described example. As shown in FIG. 2, regarding first-order transmission efficiency, efficiency is slightly reduced (24.1% to 22.2%) after metal evaporation with respect to s-polarized light. On the other hand, efficiency is increased by about four times (6.6% to 25.1%) with respect to p-polarized light. Meanwhile, regarding zero-order transmission efficiency, efficiency is considerably reduced with respect to the both types of polarized light (19.8% to 3.0% with respect to the s-polarized light and 48.4% to 10.7% with respect to the p-polarized light). In the meantime, zero-order reflected light is increased with respect to the s-polarized light (41.9% to 57.1%). This is because the zero-order transmission is shielded by the obliquely evaporated metal member 13 and energy thereof is distributed to first-order transmitted light and reflected light. In terms of the reflected diffracted light, the blaze angle [alpha] is optimized for the transmissive type and most of energy thereof is distributed to the zero-order diffracted light. From these results, it is apparent that utilization efficiency of the light in the both types of the polarized light is increased by 1.5 times or above. Moreover, it is apparent that the zero-order transmitted light is suppressed to 10% at the maximum.

As described above, it is possible to enhance the diffraction efficiency and to reduce the zero-order transmitted light by obliquely evaporating the metal members 13 on the transmission grating 10 of the blazed type. Another experiment also brought a result that such an effect was also substantial even when the shape of the diffraction grating was not a clear triangle. In general, copying accuracy declines when the diffraction grating is formed by press working as compared to the diffraction grating formed by molding. However, as the press work does not require processes such as coating or curing the resin, it is possible to mass-produce the diffraction grating at low costs. The efficiency was confirmed to be enhanced by three times or above even in the diffraction grating formed by press working (5% to 15% with respect to the first-order diffraction efficiency, for example).

Although it is possible to enhance the diffraction efficiency only by the diffraction grating itself, it is conceivable to recycle the increased zero-order reflected light. In short, it is possible to construct a combined diffraction grating having high utilization efficiency of light by means of preparing a reflecting mirror.

FIGS. 3A and 3B are views showing an embodiment of a combined diffraction grating. FIG. 3A shows a configuration example in which the transmission grating 10 and a reflecting mirror 15 are disposed in parallel. When the transmission grating 10 and the reflecting mirror 15 are disposed in parallel, it is possible to allow the zero-order reflected light to be incident on the transmission grating again at the same angle as the incident light. Meanwhile, FIG. 3B shows a configuration example in which two mirrors (a half mirror 16 and a reflecting mirror 17) are disposed so as to circulate the reflected light. The half mirror 16 is used as a mirror for allowing entrance of the incident light. As for the reflecting mirror, total reflection of a prism or a corner cube is preferred. However, a usual mirror or a Fresnel mirror can be used as well. Of course, a lens, a slit, a pin hole, or a filter such as a polarizer, which is other optical element, may be inserted in accordance with the intended use. The combined diffraction grating shown in FIG. 3A or FIG. 3B constitutes a dispersive (or optically coupled) lighting system having high utilization efficiency of light over a large area. Values of the utilization efficiency of light in consideration of recycling the reflected light are calculated and shown in FIG. 2 as effectiveness. By adopting the constitution shown in this embodiment, the calculation result of the effectiveness was confirmed to be increased by 1.6 times or above (24.2% to 39.5%).

Figure 4:
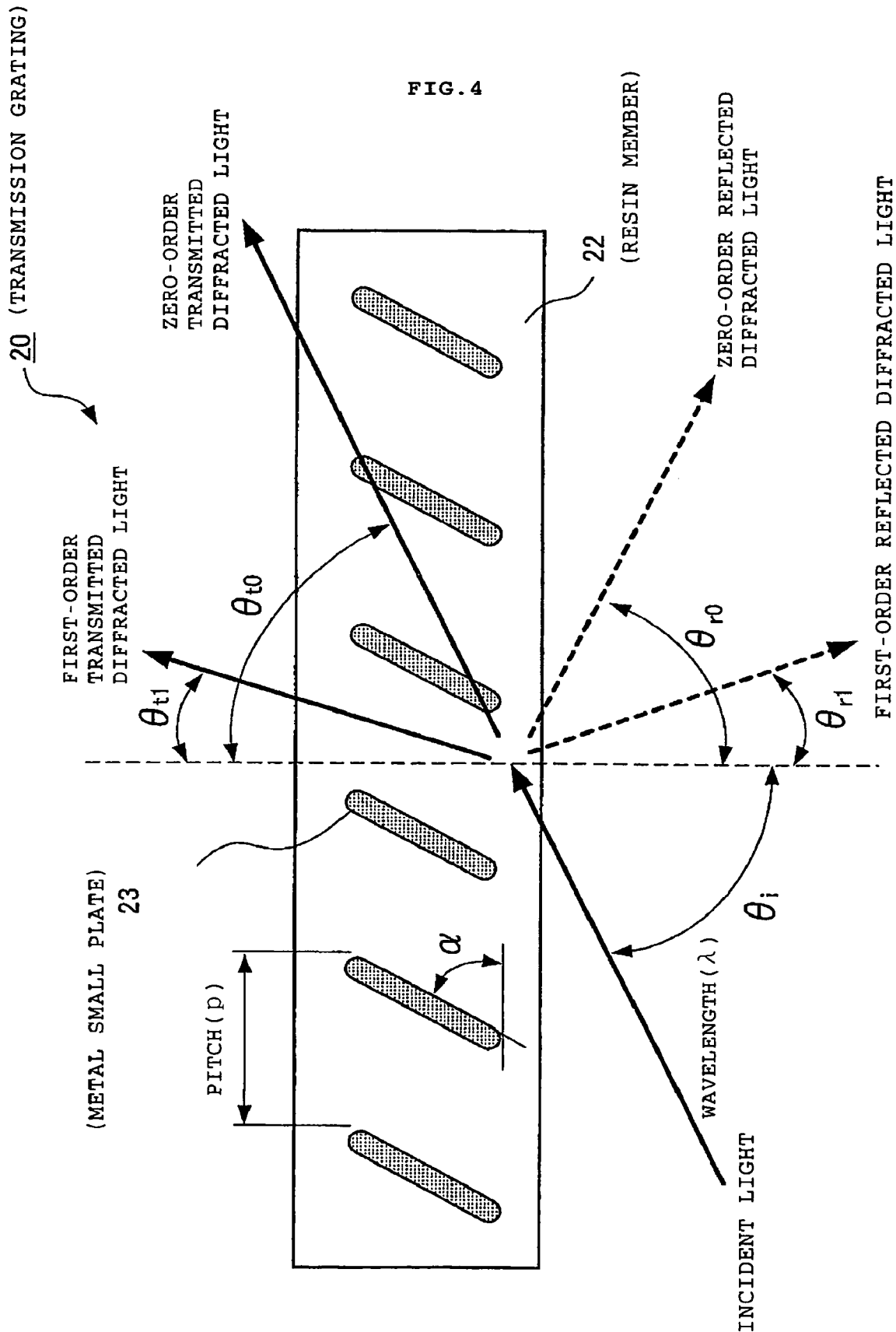
FIG. 4 is a view for explaining a second transmission grating adopting an embodiment of the present invention.

Next, another transmission grating will be described. FIG. 4 is a view for explaining a second transmission grating adopting this embodiment. A transmission grating 20 shown in FIG. 4 has a structure in which metallic small plates 23 are arranged periodically in a resin layer 22. In the transmission grating 10 shown in FIG. 1, it is possible to evaporate the metal only on blaze surfaces (or the other slant faces) by obliquely evaporating the metal member 13 having the high reflectance. By adopting this configuration, it is possible to considerably reduce intensity of the zero-order transmitted diffracted light and to enhance intensity of the first-order transmitted diffracted light. However, this transmission grating 10 has an irregular surface and may cause a trouble when the diffraction grating is closely attached to a different optical element or substrate. In such a case, when an irregular surface of a diffraction grating made of a resin layer 22a (to be described later) is buried with a resin layer 22b (to be described later) having the same refractive index as that of the resin layer 22a, as the transmission grating 20 shown in FIG. 4, it is possible to form a structure in which only the obliquely evaporated metal small plates 23 are arranged periodically inside the media having the same refractive index. Accordingly, the diffraction grating will have flat surfaces on both sides and becomes easy to handle. The metal small plates 23 inclined by the blaze angle [alpha] with respect to a film surface are arranged periodically, thereby constituting the diffraction grating. By adopting this structure, the diffraction grating is the same in principle as a reflection grating applying the metal small plates 23 as reflecting surfaces, which can obtain the high first-order diffraction efficiency and considerably reduce the intensity of the zero-order transmitted light.

Next, a method of manufacturing the transmission grating 20 shown in FIG. 4 will be described. FIGS. 5A to 5C are views for explaining the method of manufacturing the transmission grating 20. Firstly, as shown in FIG. 5A, the diffraction grating made of the resin layer 22a is formed on a substrate by use of a mould. Moreover, the resin layer 22b designed to abut on asperities of this resin layer 22a is formed as well. The resin layer 22a and the resin layer 22b can be made of the same type of resin, for example. The mould to be used for formation can be produced by mechanical cutting. Thermosetting resin or photocuring resin can be used for the resin layer 22a for forming the diffraction grating. Next, as shown in FIG. 5B, the metal small plate 23 is obliquely evaporated on one side of each diffraction grating surface. It is preferable that the metal small plates 23 have a high refractive index. Accordingly, silver or aluminum is preferred.

Thereafter, the surface of the diffraction grating after oblique evaporation of the metal small plates 23 is planarized by use of the resin layer 22b which is formed as shown in FIG. 5A, and the transmission grating 20 is formed as shown in FIG. 5C. In this way, it is possible to form the metal small plates 23 in the resin layer 22, which are arranged periodically with the certain angle with respect to the film surface, and the metal small plates 23 constitute the diffraction grating.

Note that a material of the resin layer 22b used for planarization does not always have to be of the same refractive index as the resin layer 22a which forms the diffraction grating. It is possible to use a material having a different refractive index when appropriate. Moreover, to enhance adhesion to a different element, it is also effective to coat other resin or another adhesive on the planarized surface or the substrate surface, or to subject any of the surfaces to ultraviolet treatment or discharge treatment.

Adoption of the configuration of the transmission grating 20 shown in FIG. 4 thus manufactured has an advantage that the transmission grating 20 is easy to handle because the grating surface is avoided from direct contact, for example. There is also another advantage that adhesion to a different element or substrate is enhanced and it is possible to form an element or a device more compactly. Moreover, the transmission grating 20 is excellent in retaining the high reflectance because the metal small plates 23 are not exposed to the air and are avoided from oxidation and thus from corrosion. Note that the incident angle has a limitation. When the angle of the metal small plate 23 with respect to the direction of the film surface (which corresponds to the blaze angle) is [alpha] as shown in FIG. 4, the incident angle [theta]i needs to be equal to or greater than [alpha].

Next, relations among the incident angle, the blaze angle, and the pitch will be described.

FIGS. 6A to 6C are views for explaining the relations. FIG. 6A shows a buried type which is also shown in FIG. 4, FIG. 6B shows a downward type, and FIG. 6C shows an upward type which is also shown in FIG. 1.

FIG. 6A shows the simplest case of a dispersive diffraction grating in which metal small plates (the metal small plates 23 shown in FIG. 4) are obliquely arranged. Here, [theta]i is the incident angle of incident light having a wavelength [lambda], [theta]t1 is an outgoing angle of first-order transmitted diffracted light, [alpha] is an angle between the metal small plate 23 and a substrate surface (which corresponds to the blaze angle), p is a pitch, [phi] is an angle of refracted light upon incidence on the resin layer 22, and n is a refractive index of a resin base material. Now, on the premise that the incident angle [theta]i and the outgoing angle [theta]t1 are given, the blaze angle [alpha] and the pitch p will be obtained as follows.

Firstly, the pitch p can be obtained by the following formula which is a general formula of diffraction:

$$\sin \theta t1 - \sin \theta i = \frac{\lambda}{p} \qquad \text{[Formula 1]}$$

which is equivalent to $$P = \frac{\lambda}{\sin \theta t1 - \sin \theta i} \qquad \text{[Formula 2]}$$

Meanwhile, the blaze angle is determined so that, on the assumption that the metal small plate functions as a mirror, the outgoing direction of a light which travels without diffraction coincides with a direction defined by a desired outgoing angle [theta]t1. That is, [alpha] satisfying the following should be selected:

$$\sin \phi = \frac{\sin \theta i}{n} \qquad \text{[Formula 3]}$$
$$\sin \theta t1 = n \sin(\phi + 2\alpha)$$

To be more precise, [alpha] is expressed by:

$$\alpha = \left( \arcsin\left(\frac{\sin \theta t1}{n}\right) - \arcsin\left(\frac{\sin \theta i}{n}\right) \right) / 2 \qquad \text{[Formula 4]}$$

FIG. 6B shows the case where a groove surface is placed downward. The pitch p can be obtained by a similar principle to FIG. 6A ([Formula 1] and [Formula 2]). Moreover, [phi]1 indicates a refraction angle of light refracted with respective to a perpendicular direction to an oblique surface of a groove when the light is incident on the resin base material.

When the light beam travels straight without diffraction, the light beam is refracted inside the resin and reflected by the metal surface, and travels into the air again. In this case, [alpha] and [beta] are selected so that an angle of the light outgoing to the air coincides with the desired angle [theta]t1. Such a condition is written down as follows:

$$\sin \phi 1 = \frac{\sin(\theta i - \beta)}{n} \qquad \text{[Formula 5]}$$
$$\sin \theta t1 = n \sin(\pi - 2\alpha - \beta - \phi 1)$$

Specifically, the reflected light becomes lowest and the efficiency is increased when [beta]=[theta]i. In this case, [alpha] is expressed by:

$$\alpha = \left\{ \arcsin\left(\frac{\sin \theta t1}{n} + \pi - \theta i\right) \right\} / 2 \qquad \text{[Formula 6]}$$

FIG. 6C shows a case where oblique surfaces of the saw-tooth shapes are placed upward as similar to the one shown in FIG. 1. Here, [phi]1 indicates a refraction angle with respect to a perpendicular direction to a bottom surface when light is incident on the bottom surface of the resin base material, and [phi]2 indicates a refraction angle with respect to a perpendicular direction to an oblique surface when the light outgoes from the oblique surface of the resin base material.

The pitch p can be obtained by the similar principle to FIG. 6A ([Formula 1] and [Formula 2]). Moreover, [alpha] and [beta] are obtained as similar to FIGS. 6A and 6B. The result is expressed as follows:

$$\sin \phi 1 = \left(\frac{\sin \theta i}{n}\right) \qquad \text{[Formula 7]}$$
$$\sin \phi 2 = n \sin(\phi 1 - \beta)$$

-continued $$\theta t1 = \pi - (\phi2 + 2\alpha + \beta)$$

Specifically, the efficiency becomes highest when [phi]1=[beta]. In this case, [alpha] and [beta] are obtained by:

$$\beta = \arcsin\left(\frac{\sin \theta i}{n}\right)$$ [Formula 8]

$$\alpha = \frac{\pi - (\theta t1 + \beta)}{2}$$

Next, application examples of the above-described transmission gratings 10 and 20 will be explained. In the following, description will be made on an application to a single panel projector, an application to a color filterless liquid crystal display, an application to an integrated system with a light guide constituting a backlight, and application to a demutiplexer attached to a waveguide.

Figure 7:
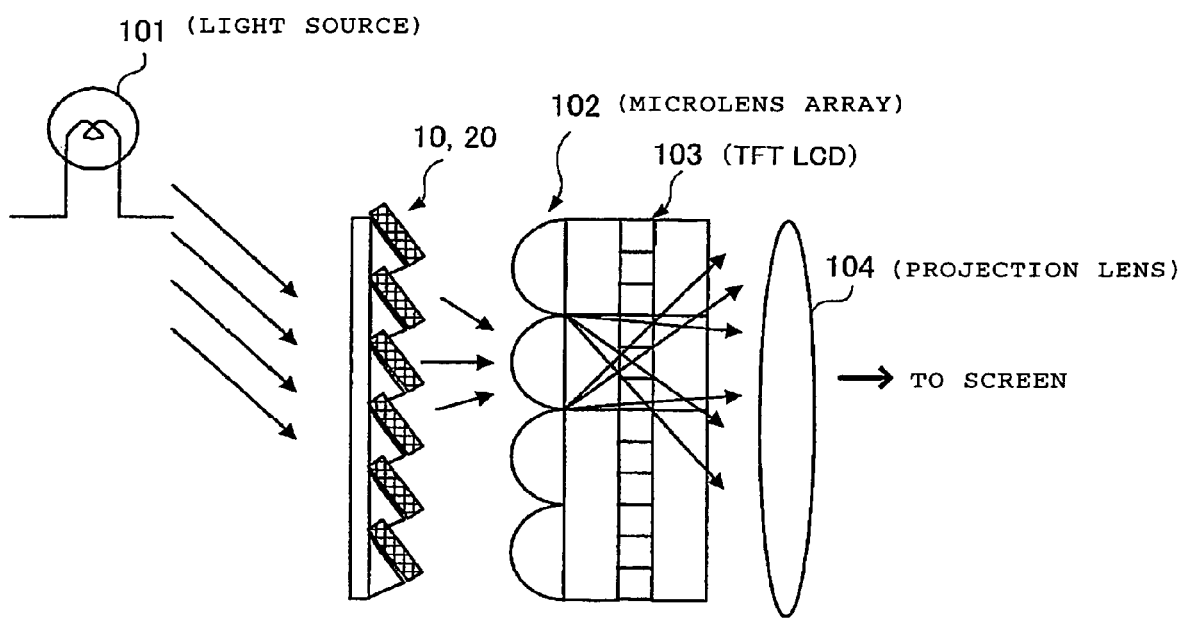
FIG. 7 is a view showing an example of an application to a single panel projector.

FIG. 7 is a view showing an example of an application to a single panel projector. Due to the merit that the transmission grating 10 shown in FIG. 1 or the transmission grating 20 shown in FIG. 4 causes almost no (very little) zero-order transmitted light, these transmission gratings are applicable to a single panel projector. There are two types in a liquid crystal projector, namely a three panel type and a single panel type. These types are distinguished by the number of active matrix liquid crystal displays used therein. The three panel type includes three active matrix liquid crystal displays corresponding to respective colors (red (R), green (G), and blue (B)). FIG. 7 shows an example of a single panel projector. The single panel projector shown in FIG. 7 includes a light source 101 made of a white xenon lamp and the like, for example, a microlens array 102 for guiding dispersed light, an active matrix liquid crystal display (TFT LCD) 103 for modulating the light dispersed into R, G, and B independently of respective subpixels for R, G, and B, and a projection lens 104 for projecting the modulated light onto a screen.

When the white xenon lamp and the like are used as the light source 101, in terms of the utilization efficiency of light, it is necessary to modulate the light dispersed into R, G, and B by use of different liquid crystal displays respectively. In the three panel type, dichroic mirrors are normally used for dispersing the light into R, G, and B. However, the three panel type requires three liquid crystal panels and three dichroic mirrors for R, G, and B. Accordingly, the three panel type causes a cost increase and difficulty in compact mounting at the same time. Therefore, the single plate type using only one active matrix liquid crystal display (TFT LCD) 103 shown in FIG. 7 has been disclosed. In the single plate type, a diffraction grating or a hologram is used as a dispersive element (a diffraction element).

The light emitted from the light source 101 and dispersed by the transmission grating 10 or 20, which is the diffraction element, outgoes by angles according to wavelengths of R, G, and B. Then, the light passes through the microlens array 102 and is incident on the active matrix liquid crystal display 103. The active matrix liquid crystal display 103 includes subpixels for R, G, and B, and respective light components are incident on the corresponding subpixels to achieve modulation independently. The light which passes through the active matrix liquid crystal display 103 is projected on the screen with the projection lens 104.

Here, a reflection grating is generally used in the case of using the diffraction grating, and a transmission grating is used in the case of the hologram. In the case of the reflective type, the light source 101 and the active matrix liquid crystal display 103 are located on the same side. Accordingly, there arises a layout problem because it is necessary to shield the light from the light source 101. Meanwhile, in the case of the transmissive type, when the zero-order transmitted light is reduced for a specific wavelength, it is not possible to perform similar reduction for other wavelengths at the same time. There is also a structure of laminating holograms corresponding to R, G, and B. However, the utilization efficiency of light declines in this structure on the whole. Moreover, materials for holograms are limited, which are expensive and have large problems of heat resistance and uniformity.

However, in the transmission grating 10 or 20 subjected to metal evaporation as shown in this embodiment, it is possible to reduce the zero-order transmitted light irrespective of the wavelength. Accordingly, it is possible to separate the light source 101 from the active matrix liquid crystal display 103 by the diffraction grating, and thereby to reduce stray light. Moreover, unlike the reflective type, the light source 101, and the active matrix liquid crystal display 103 or the screen are located in different sides with respect to the diffraction grating. Accordingly, it is easy to lay out the components and is possible to make the device compact.

Figure 8:
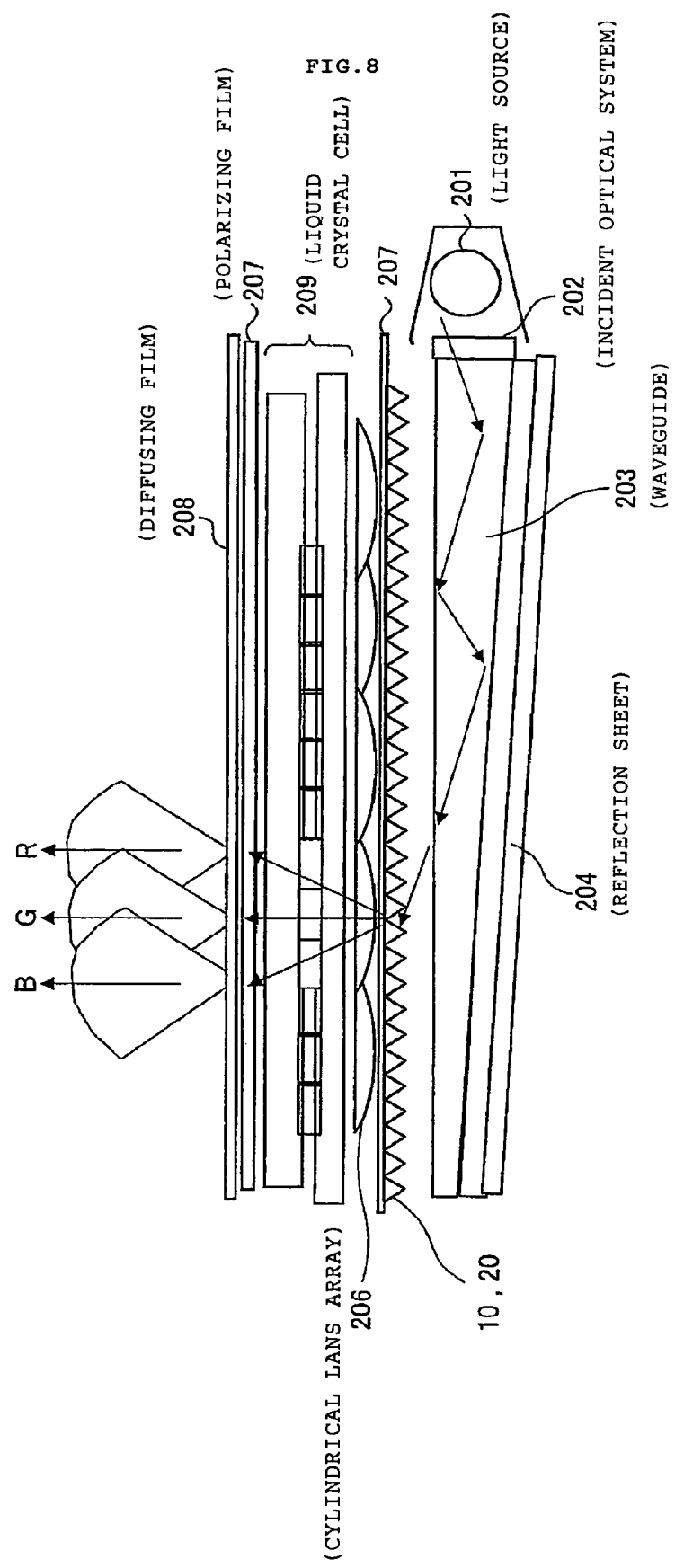
FIG. 8 is a view showing an example of an application to a color filterless liquid crystal display device (a color filterless direct view liquid crystal display device).

FIG. 8 is a view showing an example of an application to a color filterless liquid crystal display device (a color filterless direct view liquid crystal display device). This color filterless liquid crystal display device includes a light source 201 using a straight shape white fluorescent lamp, for example, an incident optical system 202 for guiding light from the light source 201, a waveguide 203 having a wedge shape, for example, a reflecting sheet (a reflecting plate) 204 made of metal, for example, and the transmission grating 10 or 20 adopting this embodiment as a dispersive element for dispersing white incident light into light components of R, G, and B. The color filterless liquid crystal display device further includes a liquid crystal cell 209 for performing light transmission and shielding, a cylindrical lens array 206 which is an optical element (a condensing element) having a plurality of cylindrical lenses or the lens, a polarizing film 207, and a diffusing film 208. In the liquid crystal cell 209, a liquid crystal layer is sealed between two glass substrates.

The light irradiated from the light source 201 is incident into the waveguide 203 through the incident optical system 202. The light incident on the waveguide 203 is repeatedly reflected by a lower surface (a surface on the reflecting sheet 204 side) and an upper surface (a surface on the liquid crystal cell 209 side) of the waveguide 203, whereby the angle of the light becomes gradually steeper. When the direction of the light exceeds a critical angle on the upper surface, the light outgoes from this upper surface. The outgoing light is dispersed into the light components of R, G, and B by the transmission grating provided with metal surfaces on oblique surfaces therein. The dispersed light is polarized by the polarizing film 207 and is incident into the cylindrical lens array 206. The cylindrical lens array 206 includes the plurality of cylindrical lenses, and each cylindrical lens corresponds to one pixel, for example. One pixel consists of three subpixels for R, G, and B. Transmission and shielding of the dispersed and polarized light components are controlled by the respective subpixels in the liquid crystal cell 209. The light components which are passed through the respective subpixels of the liquid crystal cell further pass through the polarizing film 207. Thereafter, the light components are diffused by the diffusing film 208 and then outputted. In this way, it is possible to increase luminance of the liquid crystal display device by using the transmission grating 10 or 20 adopting this embodiment for the liquid crystal display device shown in FIG. 8. Moreover, it is possible to form a combined diffraction element having high utilization efficiency of light by combining the metal reflecting sheet 204.

Figure 9:
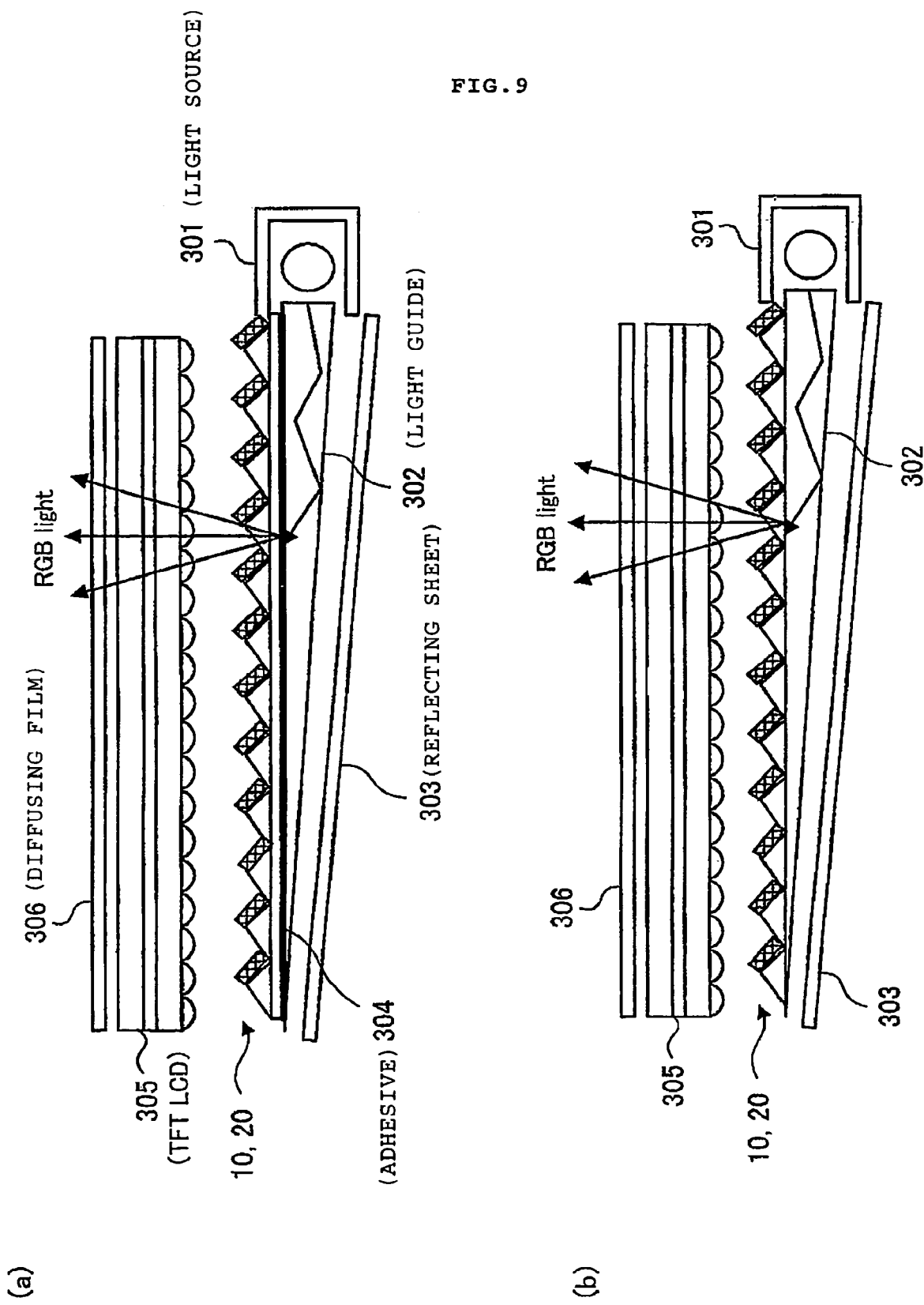
FIGS. 9A and 9B are views showing an example of an application to an integrated system with a light guide (a waveguide) constituting a backlight.
Figure 11:
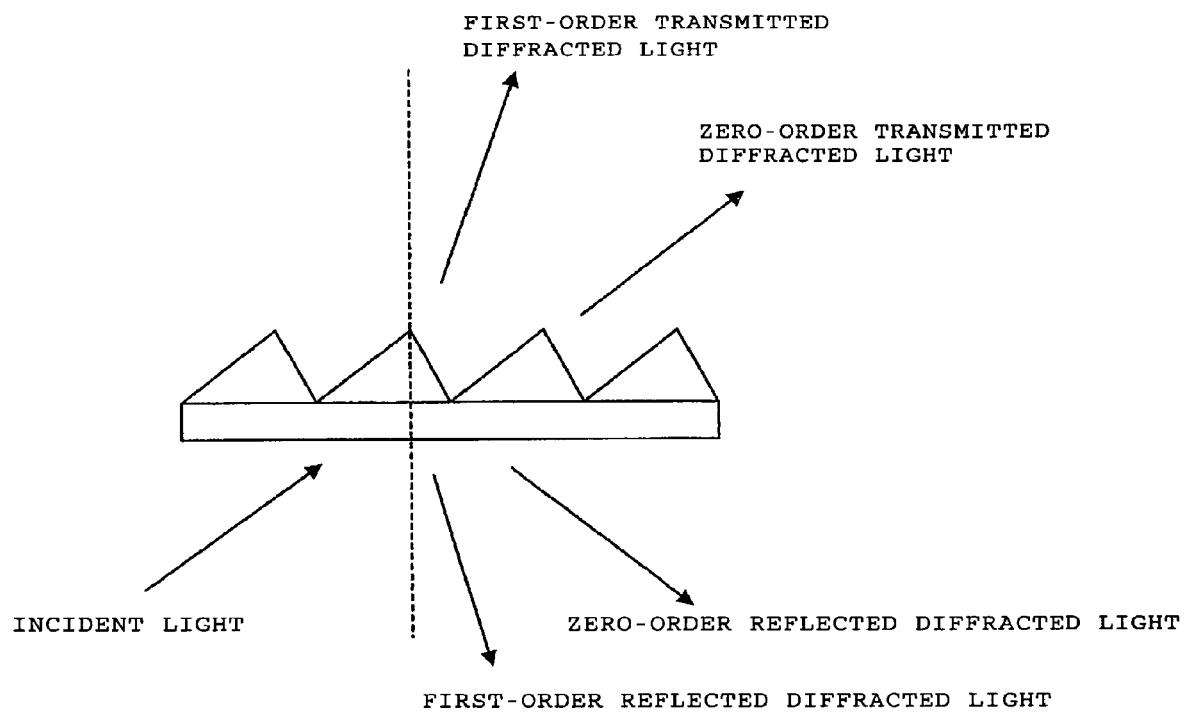
FIG. 11 is a view for explaining a configuration of a conventionally used blazed-type diffraction grating.
Figure 12:
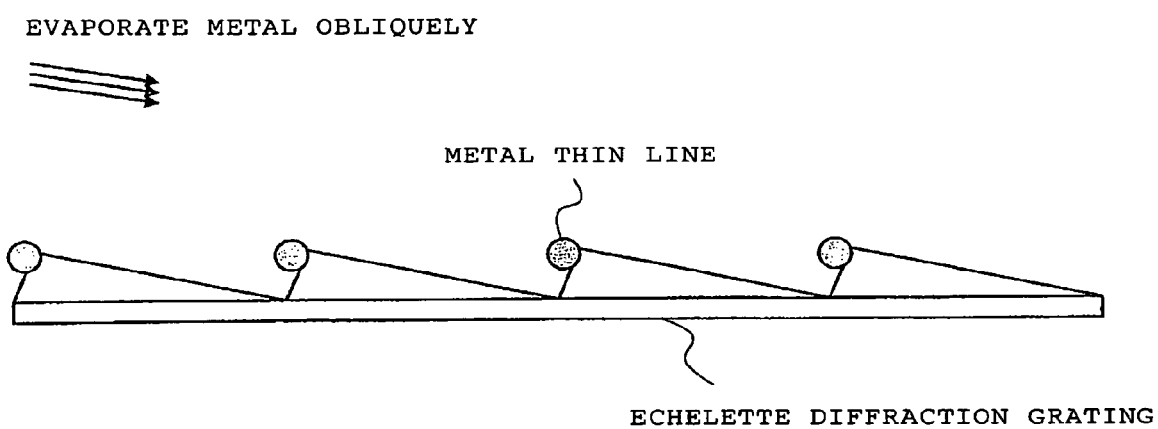
FIG. 12 is a view showing an example of a wire grid polarizer.

FIGS. 9A and 9B are views showing an example of an application to an integrated system with a light guide (a waveguide) constituting a backlight. FIG. 9A exemplifies a backlight in which a diffraction grating and a light guide are integrated by adhesion. Meanwhile, FIG. 9B shows a case where the refractive index of the resin members 12 or 22 (see FIG. 1 and FIG. 4) constituting the transmission grating 10 or 20 is set smaller than a refractive index of the light guide. By integrating the diffraction grating and light guide, it is possible to reduce the number of components and to reduce the number of laminated layers. Moreover, there is also an advantage to avoid intervention of the air and thereby to enhance the utilization efficiency of the light.

A flat backlight shown in FIG. 9A includes a light source 301 using a straight shape white fluorescent lamp, for example, a light guide 302 which is a waveguide for guiding light from the light source 301 which is formed into a wedge shape, for example, a reflecting sheet 303 having a mirror surface formed by evaporating aluminum or silver, for example, an adhesive 304 for adhering the light guide 302 to the transmission grating 10 or 20, a liquid crystal cell (TFT LCD) 305 for controlling light transmission and shielding, and a diffusing film 306 for diffusing the light. In the example shown in FIG. 9A, a material having a lower refractive index than acrylic resin, which is a main material of the light guide 302, is used as the adhesive 304. Since the refractive index of acrylic resin is about 1.49, it is possible to use fluorocarbon photocuring resin having a lower refractive index (a refractive index from 1.3 to 1.5) and the like. By integrating the transmission grating 10 or 20 with the light guide 302 as shown in FIG. 9A by using this low refractive index material as the adhesive 304, collimated light can be incident on the transmission grating 10 or 20 and dispersedly outgo without impairing internal total reflection of the light guide 302.

Meanwhile, as shown in FIG. 9B, it is possible to directly form the transmission grating 10 or 20 onto the light guide 302 by using the low refractive index material as the resin members 12 or 22 for forming the transmission grating 10 or 20. In this configuration, when the pitch p of the diffraction grating is increased, the backlight can function as a transmissive Fresnel mirror although the effect of diffraction is decreased.

FIGS. 10A and 10B are views showing configuration examples of using the diffraction grating adopting this embodiment as a demutiplexer to be attached to a waveguide. FIG. 10A shows a configuration example of dispersing light from the waveguide toward an element (a detecting element 405) on a substrate 404, and FIG. 10B shows a configuration example of coupling an optical signal from an element (a light-emitting element 406) on a substrate 404 with the waveguide. Since the transmission grating 10 or 20 adopting this embodiment can considerably reduce the zero-order transmitted light, the transmission grating 10 or 20 can be utilized by attaching it to the waveguide. In FIGS. 10A and 10B, layers having slightly different refractive indices, namely, a layer of core 402 and layers of clad 401 are provided as the waveguide. The core 402 is sandwiched by the clad 401 so as to form a diffraction grating between the core 402 and the clad 401. Meanwhile, in FIG. 10A, the demutiplexer includes a lens 403 for condensing light outputted from the waveguide consisting of the core 402 and the clad 401, and the substrate 404 having the detecting element 405 for detecting the light from the lens 403. A diffraction angle of incident light is changed in accordance with the pitch of the transmission grating 10 or 20. Accordingly, it is possible to control a splitting ratio by the blaze angle and a total length of the grating. The light split from the waveguide is incident on the detecting element 405 on the substrate 404 through the condenser lens (the lens 403), and is converted into an electric signal.

On the other hand, in FIG. 10B, the demutiplexer includes the substrate 404 having the light-emitting element 406 such as a vertical-cavity surface-emitting laser (VCSEL), and the lens 403 for guiding light outputted from this light-emitting element 406 to the waveguide. Here, the light enters from the opposite direction to the light illustrated in FIG. 10A. In the demutiplexer shown in FIG. 10B, an electric signal from each element on the substrate 404 is converted into an optical signal by use of the light-emitting element 406 such as a semiconductor laser, and the optical signal is outputted to the waveguide below the substrate 404. The outputted light enters the transmission grating 10 or 20, and then enters the wave guide. In this event, a ratio between diffraction to the left and diffraction to the right varies greatly by the effect of oblique evaporation of the metal member 13 (the metal small plates 23). In this way, it is possible to guide the light to travel in one direction.

Regarding the core 402 and the clad 401 which constitute the waveguide, the refractive index of the core 402 is set higher than the refractive index of the clad 401. Such a difference in refractive index is set in a range from about 0.01 to 0.1. Accordingly, the light traveling in the core 402 is highly collimated. The light enters the layer of core 402 and travels by an angle equal to or greater than a critical angle which is determined by the difference in refractive index between the core 402 and the clad 401 (that is, total reflection of the light is repeated). Particularly, a multimode waveguide has a large diameter of the core 402 in a range from 10 [micrometers] to 100 [micrometers], and such a multimode waveguide is used for short-distance communication. This waveguide is formed on a surface layer portion (or the inside) of the substrate, and performs transmission and reception of the light to and from the chip (such as the detecting element 405 or the light-emitting element 406) located on the substrate 404. Particularly, in an attempt to transmit the optical signal from the waveguide to a plurality of chips, it is necessary to split the light, and a so-called demutiplexer is required.

In this embodiment, when forming the waveguide, the diffraction grating is formed between the core 402 and the clad 401, and in particular, the transmission grating 10 or 20 with the structure including the obliquely arranged metal small plates is inserted. In this way, this device is used as a demutiplexer. Although the light traveling in the layer of the core 402 only has an angle equal to or greater than the critical angle, the lights travel by various angles in the range from the critical angle to 90 degrees (the multimode). When a simple mirror is inserted into the waveguide, such angular divergence is directly outputted to the air. Therefore, there may be a case where the lens 403 cannot condense the light sufficiently. Since the diffraction grating provides selectivity of the angle, the diffraction grating can branch only the light having a certain angle (which corresponds to the incident angle from the viewpoint of the diffraction grating) to an upward direction. Meanwhile, a diffraction grating or a mirror is used to branch signal-carrying light off to the respective chips on the substrate 404. In this case, it is convenient to use the diffraction grating in terms of the process because the diffraction grating can be integrally formed when forming the waveguide. When using a transmission grating, the amount of zero-order transmitted light is generally large, and the zero-order transmitted light incurs not only a loss but also stray light that causes a reduction in an S/N ratio. It is possible to prevent such stray light by use of the transmission grating (such as 10 and 20) adopting this embodiment.

In this way, when the diffraction grating adopting this embodiment is applied to the demutiplexer, it is possible to considerably reduce the zero-order transmitted light and thereby to reduce power loss. Although the zero-order reflected light is also increased, the reflected light travels inside the waveguide and therefore does not cause the loss. Moreover, it is possible to increase desired first-order transmitted light which has narrow angular divergence. Accordingly, it is possible to ensure transmission of the optical signal to the chip on the substrate 404 by means of condensing the light with the lens 403. Furthermore, this structure can be set bidirectional. Therefore, it is possible to allow the light to enter the waveguide from the opposite route.

As described above in detail, according to this embodiment, it is possible to enhance the diffraction efficiency of the first-order transmitted light and to considerably reduce divergence into the zero-order transmitted light in the transmission grating which can be mass produced at low costs. Moreover, by means of reflecting the reflected diffracted light using a mirror or the like disposed in parallel to the transmission grating, it is possible to recycle the reflected light and thereby to construct a system having high utilization efficiency of light. As a result, in a display device such as a liquid crystal display or a projector which uses these diffraction gratings, it is possible to increase luminance while reducing the number of components.

Besides a color filterless direct view liquid crystal display device, implementation examples of the present invention include a color display device such as a color filterless liquid crystal projection device, an application to an integrated system with a light guide constituting a backlight, a demutiplexer to be attached to a waveguide, and the like.

Although the preferred embodiments of the present invention have been described in detail, it should be understood that various changes, substitutions and alternations can be made therein without departing from spirit and scope of the inventions as defined by the appended claims.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method of manufacturing a transmissive diffraction grating, the method comprising the steps of:
   forming a transmissive diffraction grating by use of a mould and resin, wherein the transmissive diffraction grating includes diffraction grating members that diffract incident light thereby producing a dispersion of the incident light; and
   applying an evaporative metal coating onto the formed transmissive diffraction grating from an oblique direction to substantially coat an entire surface of one side of each of the diffraction grating members so that the metal substantially shields zero-order transmitted light.

2. The method of claim 1, further comprising the step of:
   burying a side of the diffraction grating containing the diffraction grating members with an additional resin layer.

3. The method of claim 1, further comprising the step of:
   disposing a reflecting member on an opposite side of the diffraction grating members and at a distance parallel thereto for returning a zero-order reflected light to the diffraction grating.

4. The method of claim 1, further comprising the step of:
   disposing a plurality of reflecting members on an opposite side of the diffraction grating members at an oblique angle thereto for circulating a zero-order reflected light to the diffraction grating.

5. The method of claim 1, wherein the diffraction grating is a blazed-type diffraction grating formed on a glass substrate by use of transparent resin members in a saw-tooth shape.

6. The method of claim 1, wherein the metal has a reflectance of 90 percent or greater at the wavelength of the incident light.

7. The method of claim 1, wherein the metal has a thickness of at least 200 nm.

8. An apparatus to manufacture a transmissive diffraction grating, the apparatus comprising:
   means for forming a transmissive diffraction grating by use of a mould and resin, wherein the diffraction grating includes diffraction grating members that diffract incident light thereby producing a dispersion of the incident light; and
   means for applying an evaporative metal coating onto the formed transmissive diffraction grating from an oblique direction to substantially coat an entire surface of one side of each of the diffraction grating members so that the metal substantially shields zero-order transmitted light.

9. The apparatus of claim 8, further comprising:
   means for burying a side of the diffraction grating containing the diffraction grating members with an additional resin layer.

10. The apparatus of claim 8, further comprising:
    means for disposing a reflecting member on an opposite side of the diffraction grating members and at a distance parallel thereto for returning a zero-order reflected light to the diffraction grating.

11. The apparatus of claim 8, further comprising:
    means for disposing a plurality of reflecting members on an opposite side of the diffraction grating members at an oblique angle thereto for circulating a zero-order reflected light to the diffraction grating.

12. The apparatus of claim 8, wherein the diffraction grating is a blazed-type diffraction grating formed on a glass substrate by use of transparent resin members in a saw-tooth shape.

13. The apparatus of claim 8, wherein the metal has a reflectance of 90 percent or greater at the wavelength of the incident light.

14. The apparatus of claim 8, wherein the metal has a thickness of at least 200 nm.

* * * * *

UNITED STATES PATENT AND TRADEMARK OFFICE
CERTIFICATE OF CORRECTION

PATENT NO. : 7,808,704 B2  
APPLICATION NO. : 11/964584  
DATED : October 5, 2010  
INVENTOR(S) : Yoichi Taira et al.

Page 1 of 1

It is certified that error appears in the above-identified patent and that said Letters Patent is hereby corrected as shown below:

Title Page:
Insert -- [63] Related U.S. Application Data
  Continuation of application No. 10/960,318, filed on October 07, 2004, now Pat. No. 7,315,419 --

Insert -- [30] Foreign Application Priority Data
  October 09, 2003  (JP) ................ 2003-351312 --

Signed and Sealed this

Twenty-first Day of December, 2010

David J. Kappos
*Director of the United States Patent and Trademark Office*